United States Patent [19]

Nakamura et al.

[11] 4,340,915
[45] Jul. 20, 1982

[54] MICROPHONE SENSITIVITY-CHANGING APPARATUS

[75] Inventors: Toshiaki Nakamura; Akira Yamamoto, both of Hachioji, Japan

[73] Assignee: Olympus Optical Co., Ltd., Tokyo, Japan

[21] Appl. No.: 154,444

[22] Filed: May 29, 1980

[30] Foreign Application Priority Data

Jun. 13, 1979 [JP] Japan ............................ 54-80439[U]

[51] Int. Cl.³ .......................... G11B 5/00; G11B 15/10
[52] U.S. Cl. ....................................... 360/61; 360/68; 369/174
[58] Field of Search ................... 360/68, 33, 61, 137; 369/48, 174, 292, 25; 179/167; 358/185

[56] References Cited

U.S. PATENT DOCUMENTS 3,352,169 11/1967 Delin et al. ................... 360/61 X
4,021,854 5/1977 Saito ............................. 360/137 X
4,127,880 11/1978 Emmert ............................ 360/68

Primary Examiner—Bernard Konick
Assistant Examiner—Donald McElheny, Jr.
Attorney, Agent, or Firm—Frishauf, Holtz, Goodman and Woodward

[57] ABSTRACT

A microphone sensitivity-changing apparatus used with a tape recorder whose recording or playback mode can be paused and whose microphone has its sensitivity changed in accordance with the object for which said tape recorder is applied, the improvement being that a first switch for instructing the pause mode and a second switch for instructing the changeover of the sensitivity of the microphone are operated interlockingly with each other.

8 Claims, 2 Drawing Figures

4,340,915

MICROPHONE SENSITIVITY-CHANGING APPARATUS

BACKGROUND OF THE INVENTION

This invention relates to a tape recorder whose microphone has its sensitivity made changeable in accordance with the object for which said tape recorder is applied.

A midget portable tape recorder is applied mainly for recording by a microphone. The condition under which recording is carried out by a microphone varies with circumstances. Where recording is undertaken with a microphone set apart from a sound source (hereinafter referred to as "off-mike recording"), for example, in a conference, then the microphone is preferred to have a high sensitivity. Where so-called dictation recording is carried out (hereinafter referred to as "on-mike recording"), then the microphone is desired to have a relatively low sensitivity. A tape recorder applied to the above-mentioned off-mike and on-mike recording is generally provided with an automatic level control (ALC) circuit such as an automatic gain control (AGC) unit or limiter. However, the level of an input to a microphone widely varies between, for example, comference recording (off-mike recording) and dictation recording (on-mike recording). Therefore, the ordinary simple low grade ALC circuit can not follow such noticeable variations in the level of an input to a microphone.

In other words, a tape recorder should be equipped with a sensitivity-changeable microphone in order to be suitably used not only for conference recording but also for dictation recording.

With the conventional portable tape recorder, a pause button for effecting a pause, and a switch for changing the sensitivity of a microphone are independently provided. Therefore, the outside of the known portable tape recorder has to be fitted with at least two switches for the pause mode and sensitivity-changing mode. This arrangement obstructs the miniaturization of an extremely small tape recorder such as a microcassette type. Further, an independent microphone sensitivity-changing switch should be shifted for each object of recording, thus involving troublesome work.

SUMMARY OF THE INVENTION

This invention has been accomplished in view of the above-mentioned circumstances, and is intended to provide a microphone sensitivity-changing apparatus in which a pause button and microphone sensitivity-changing switch are interlockingly operated to change the sensitivity of a microphone interlockingly with the actuation of a pause button.

DETAILED DESCRIPTION OF THE PREFERRED EMBODIMENT

Figure 1:
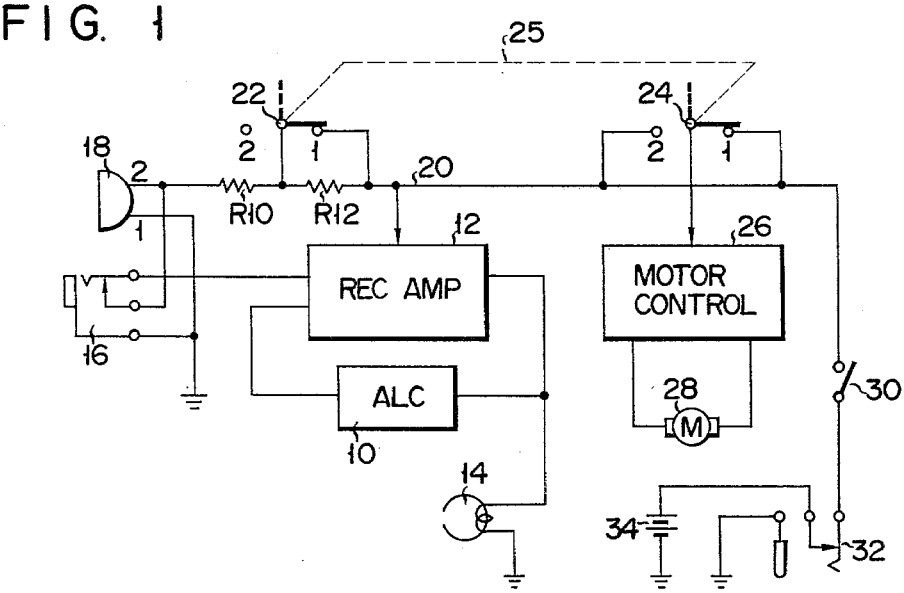
FIG. 1 is a circuit diagram of a microphone sensitivity-changing apparatus embodying this invention.

To avoid duplication of description, the same or similar parts are denoted by the same numerals throughout the drawing, description thereof being omitted.

FIG. 1 shows an arrangement of a microphone sensitivity-changing apparatus according to one embodiment. Description is only given of the case where recording is carried out. A recording circuit 12 provided with an ALC circuit 10 is connected to a recording head 14. This recording head 14 is biased by a bias current delivered from a bias oscillator (not shown). The recording circuit 12 is supplied with an output signal from a built-in microphone 18 through a change-over junction of an input jack 16. The microphone 18 is formed of, for example, an electret condenser microphone. One end of the microphone 18 is grounded. The other end of the microphone 18 from which an output is sent forth is connected to a power supply line 20 through a series circuit formed of a resistors R10 and R12. These resistors R10 and R12 act as load resistors for the microphone 18. The sensitivity of the microphone 18 varies with the value of the impedance of said load resistors.

The resistors R10 and R12 are connected at their junction to a contactor of a microphone sensitivity-changing switch 22 (a second switch). The first contact of the switch 22 is connected to the other end of the resistor R12. The second contact of the switch 22 is left idle. The switch 22 is operated interlockingly with a pause switch 25 (a first switch). The switches 22, 24 jointly constitute a 2-gang, 2-contacts and 3-positions switch system 25, whose operation is changed over interlockingly with a slider type pause button (not shown). The first and second fixed contacts of the pause switch 24 are connected to the power supply line 20. The movable contact of the pause switch 24 is connected to a motor control circuit 26. This motor control circuit 26 constitutes an electronic governor or servo circuit for controlling the running speed of a motor 28. Said motor control circuit 26 may be formed of, for example, a model TCA 955 manufactured by Siemens Co., West Germany. When the motor control circuit 26 is supplied with power from the power supply line 20, then the motor 28 is driven at a prescribed speed. The power supply line 20 is connected to the positive pole of a battery 34 through a main switch 30 and the change-over contact of an external power supply jack 32. The negative pole of the battery 34 is grounded.

Where, as shown in FIG. 1, the microphone sensitivity-changing switch 22 and pause switch 24 respectively have the first contact selectively operated, then the motor control circuit 26 is supplied with power, and the resistor R12 is short-circuited. In this case, the resistor R10 alone acts as a load resistor for the microphone 18, causing the microphone 18 to decrease in sensitivity. This condition is adapted at the time of, for example, dictation recording. Where the pause button is set for the pause mode, then the contactors (movable contacts) of the switches 22, 24 take a neutral position as indicated in a broken line in FIG. 1 in which said contactors do not touch either the first or the second contact fixed. At this time, the motor control circuit 26 ceases to be supplied with power, thereby ensuring the pause mode. As a result, the resistor R12 is released from a short-circuited state, and the load resistance to the microphone 18 is increased to R10+R12, causing the microphone 18 to have a high sensitivity. As described above, during dictation or on-mike recording, the pause button causes the switches 22, 24 respectively to have their conditions changed from the first contact position to the neutral position.

In contrast for conference recording or off-mike recording, the pause button causes the switches 22, 24 respectively to have their conditions changed from the neutral position to the second contact position. In this case, the motor control circuit 26 is supplied with power through the second fixed contact of switch 24. The load resistance to the microphone 18 is always set at R10+R12. As a result, the microphone 18 retains a high sensitivity. According to the arrangement shown in FIG. 1, the low and high sensitivity modes of the microphone 18 are selected by the operation of a single pause button. At the pause mode, the microphone 18 always has a high sensitivity. The reason for this is as follows.

During dictation or on-mike recording, the recording mode and pause mode frequently take place. The ALC circuit 10 quickly decreases in gain or falls when the microphone 18 is supplied with a large input. Conversely where the microphone 18 receives a small input, the ALC circuit 10 slowly increases in gain or rises. Such different speeds in the rise and fall of the ALC circuit are effectively utilized to save the listener from an unnatural sense of hearing at the subsequent reproduction of the sound recorded in a magnetic tape through the microphone 18. The advantages of letting the microphone retain a high sensitivity at the pause mode are that since the ALC circuit 10 still has a relatively low gain immediately after the microphone condition is shifted from the pause mode to dictation recording, it is possible to suppress mechanical noises or the transient noises of an amplifier system which generally arise right after the pause mode is released; and when recording is commenced, dictated sounds do not lose clearness, making it possible to carry out good dictation recording even after the release of the pause mode.

If, conversely from the foregoing description, the microphone 18 is allowed to have a low sensitivity at the pause mode, then the ALC circuit relatively increases in gain, readily obstructing the clearness of recorded sounds, for example, by the above-mentioned transient noises of the amplifier system at the start of recording.

Figure 2:
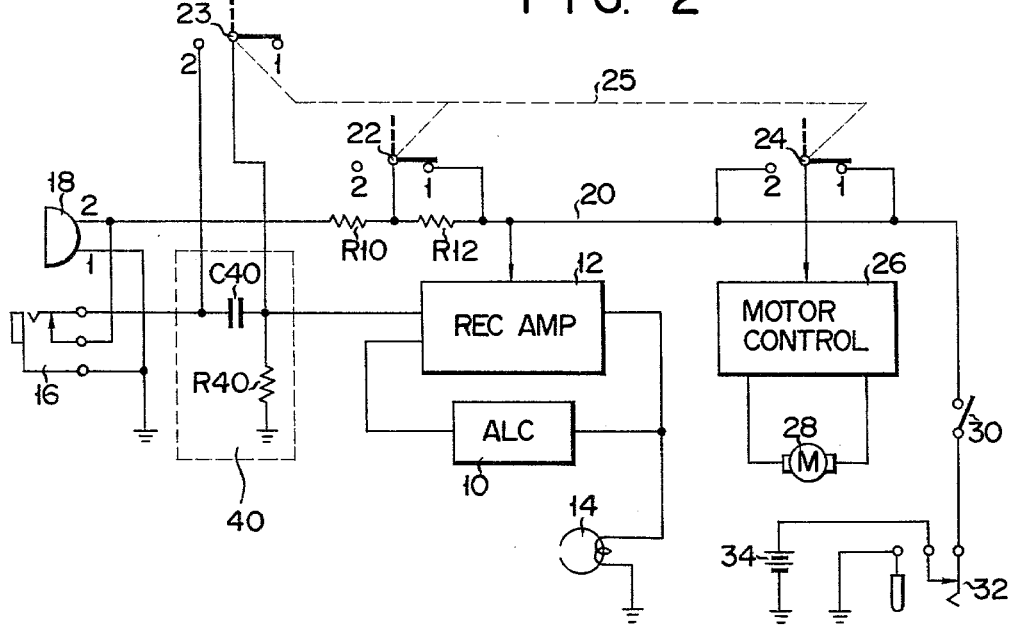
FIG. 2 is a modification of FIG. 1.

Although specific constructions have been illustrated and described herein, it is not intended that the invention be limited to the elements and constructions disclosed. One skilled in the art will recognize that other particular elements or sub-constructions may be used without departing from the scope and spirit of the invention. For example, the switch system 25 may be of a 3-circuit type by also including a switch 23 as shown in FIG. 2. Further, it is possible to couple a low-cut (i.e., high pass) filter 40 to the additional 1-circuit switch 23. The on-mike recording generally tends to muffle sounds, though the extent of said muffling varies with the characteristics of a microphone used. Where, therefore, the low frequency region of an input to a microphone is cut at dictation recording, then sounds can be recorded more clearly. The aforesaid microphone sensitivity-changing switch 22 and pause switch 24 may be replaced by transistor switches.

What we claim is:

1. In a tape recorder having means for providing a pause mode of operation, and a microphone circuit which includes a microphone, a microphone sensitivity-changing apparatus for changing the sensitivity of the microphone circuit in accordance with the object for which said tape recorder is being used, the improvement comprising:
 a first switch means coupled to said pause mode providing means for controlling the pause mode of the tape recorder; and
 second switch means coupled to said microphone circuit and to said first switch means for selectively changing the sensitivity of the microphone;
 said second switch means being interlockingly operable with said first switch means, whereby operation of said first switch means causes operation of said second switch means to change said sensitivity of the microphone.

2. The microphone sensitivity-changing apparatus of claim 1, wherein, when said first switch means designates the pause mode, said sensitivity is high; and when said first switch means is released from the pause mode, said sensitivity is low, as controlled by said interlockingly operated second switch means.

3. The microphone sensitivity-changing apparatus of claim 1 or 2, which comprises:
 a low-cut filter included in said microphone circuit for decreasing the amplitude of low frequency components of a signal corresponding to an output from a microphone; and
 third switch means interlockingly operable with said first and second switch means, and being coupled to said low-cut filter, for changing the cut-off frequency of said low-cut filter in interlocking relationship with operation of said first and second switch means.

4. The microphone sensitivity-changing apparatus of claim 3, wherein said third switch means causes the cut-off frequency of said low-cut filter to rise when said first and second switch means are operated to positions which cause the microphone sensitivity to fall in accordance with changes in the operation modes of said tape recorder.

5. A tape recorder having a microphone circuit and a pause device for temporarily stopping the transporting of tape on the tape recorder comprising:
 first switch means operably coupled to said pause device for controlling the pause operation;
 second switch means operably coupled to said microphone circuit for changing the sensitivity thereof; and
 means coupled to said first and second switch means for ganging them so that a change operation of said first switch means is synchronized with that of said second switch means.

6. The tape recorder of claim 5, wherein when said first switch means designates the pause operation of said tape recorder, said sensitivity of said microphone circuit is high; and when said first switch means is released from the pause operation position thereof, said sensitivity of said microphone circuit is low, as controlled by said ganged operation of said first and second switch means.

7. The tape recorder of claim 5 or 6, wherein a microphone is coupled to said microphone circuit, and further comprising:
 a low-cut filter included in said microphone circuit for decreasing the amplitude of low frequency components of a signal corresponding to an output from the microphone; and
 third switch means interlockingly operable with said first and second switch means, and being coupled to said low-cut filter, for changing the cutoff frequency of said low-cut filter in interlocking relationship with operation of said first and second switch means.

8. The tape recorder of claim 7, wherein said third switch means causes the cut-off frequency of said low-cut filter to rise when said first and second switch means are operated to positions which cause the microphone sensitivity to fall in accordance with changes in the operation modes of said tape recorder.

* * * * *

UNITED STATES PATENT AND TRADEMARK OFFICE
CERTIFICATE OF CORRECTION

PATENT NO. : 4,340,915

DATED : July 20, 1982

INVENTOR(S) : Toshiaki NAKAMURA, et al

It is certified that error appears in the above-identified patent and that said Letters Patent is hereby corrected as shown below:

COLUMN 2, line 23, after "pause switch" change "25" to --24--;

COLUMN 2, line 55, change "second contact fixed" to --second fixed contact--.

Signed and Sealed this

Twenth-eighth Day of September 1982

[SEAL]

Attest:

Attesting Officer

GERALD J. MOSSINGHOFF

Commissioner of Patents and Trademarks